US008881302B1

(12) United States Patent
Ace et al.

(10) Patent No.: US 8,881,302 B1
(45) Date of Patent: Nov. 4, 2014

(54) DETECTING SECURITY TOKEN REUSE IN A THIRD PARTY MEDIATED VIDEO AUTHENTICATION SYSTEM

(75) Inventors: Oleg Ace, Woodside, CA (US); Robert Christopher Gaunt, Mountain View, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/438,798

(22) Filed: Apr. 3, 2012

(51) Int. Cl.
*G06F 17/30* (2006.01)

(52) U.S. Cl.
USPC ............... 726/27; 726/9; 726/20; 713/186; 455/557

(58) Field of Classification Search
USPC ............... 726/27, 9, 20; 713/186; 455/557
See application file for complete search history.

(56) References Cited

U.S. PATENT DOCUMENTS

2010/0107229 A1* 4/2010 Najafi et al. .................. 726/6
2011/0136539 A1* 6/2011 Jain et al. .................. 455/557

OTHER PUBLICATIONS

"IBM Lightweight Third-Party Authentication," Wikipedia, http://en.wikipedia.org/wiki/IBM_Lightweight_Third-Party_Authentication, Last accessed Mar. 26, 2012.
Juric, Matjaz B., "Securing a BPEL process," Packt Publishing Technical & IT Book and eBook Store, Oct. 2010, http://www.packtpub.com/article/securing-a-bpel-process, Last accessed Mar. 26, 2012.
Vectorx, "Token Manager," CodeProject, Mar. 3, 2012, http://www.codeproject.com/Articles/332347/Token-Manager, Last accessed Mar. 26, 2012.
Wicker, Jason, "Web security concepts and considerations for IBM WebSphere Portal administrators," http://www-10.lotus.com/ldd/portalwiki.nsf/dx/Web_security_concepts_and_considerations_for_IBM_WebSphere_Portal_administrators, Last accessed Mar. 26, 2012.

* cited by examiner

*Primary Examiner* — Thanhnga B Truong
(74) *Attorney, Agent, or Firm* — Amin, Turocy & Watson, LLP

(57) ABSTRACT

Aspects relate to determining whether a security token has previously been used in order to gain access to premium content. When a security token is received, the token is evaluated to determine whether the token has been previously received, which indicates an attempt to reuse the token. If the token was previously received, the token is rejected and access to the premium content is denied. If the token was not previously received, the token is analyzed by a third party verification process. If the third party verification process authenticates the token, access to the premium content is granted. With the disclosed aspects, a security vulnerability related to reuse of a security token can be mitigated.

20 Claims, 8 Drawing Sheets

DETECTING SECURITY TOKEN REUSE IN A THIRD PARTY MEDIATED VIDEO AUTHENTICATION SYSTEM

TECHNICAL FIELD

This disclosure relates to authentication and the detection of security token reuse in a third party mediated video authentication system.

BACKGROUND

Some video sharing websites use a third party authentication service in order to decide whether a particular user can view a particular video. Thus, the third party authentication service can be used to provide access control for certain premium content. The third party authentication service can provide the infrastructure and can mediate the interaction between the user and their television provider. If the user can access the content on the television, the user can also access the content online. Once the user is authenticated to the third party authentication service, the user is able to generate authorization tokens for particular videos, which are passed on to the video sharing website(s), which verifies the authorization token using a library provided by the third party.

The tokens can have a validity period, such as five minutes. The user can start watching a video within the validity period and can continue to watch the video in its entirely once authorized. An issued token can be used any number of times during the validity period and there are no additional authorizations supplied to the video sharing website. Thus, the token is the only mechanism used to allow the video playback. This can create a security vulnerability where a malicious user possessing appropriate credentials could set up a system to redistribute the tokens, allowing any number of unauthorized users to access the video within the validity period. Alternatively, a token from a regular user can be stolen and reused, resulting in the same problem.

The above is a general problem that can be inherent to a system that provides authorization using tokens that are verified based on cryptographic signatures and timestamp only, where the token can be reused any number of times within its validity period.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope of particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with the detection of security token reuse in a third party mediated video authentication system. Detection of token reuse can mitigate redistribution of tokens and use of the redistributed tokens by unauthorized users.

An embodiment relates to a system that includes a memory and a processor. The memory can store computer executable components and the processor can execute the computer executable components stored in the memory. The computer executable components can include an obtainment component that can receive a security token for access to premium content. The security token can be generated based on an access control determined by a third party authentication service. The computer executable components can also include a matching component that can compare the security token to a database of previously received security tokens. Further, the computer executable components can also include a verification component that can selectively grant access to the premium content as a result of the comparison by the matching component.

Another embodiment relates to a method that can include using a processor to execute computer executable components stored in a memory. The method can also include receiving a first security token from a first user. The first security token can be associated with premium content. The method can also include providing access to the premium content based on a first use of the first security token and retaining information about the first use of the first security token. The method can also include receiving a second security token from a second user. The second security token can be associated with the premium content. Further, the method can include comparing the second security token with the first security token and selectively denying the second user access to the premium content as a function of the comparing.

A further embodiment relates to a device that can include a memory that stores computer executable components and a processor that executes the computer executable components stored in the memory. The device can also include an obtainment component that can receive a security token generated based on access control determined by a third party authentication service. The security token can be used to grant access to premium content. The device can also include a matching component that compares the security token to a plurality of received security tokens. Further, the device can include a verification component that selectively grants access to the premium content based, in part, on a result of the comparison by the matching component.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

BRIEF DESCRIPTION OF THE DRAWINGS

Various non-limiting implementations are further described with reference to the accompanying drawings in which.

DETAILED DESCRIPTION

Figure 1:
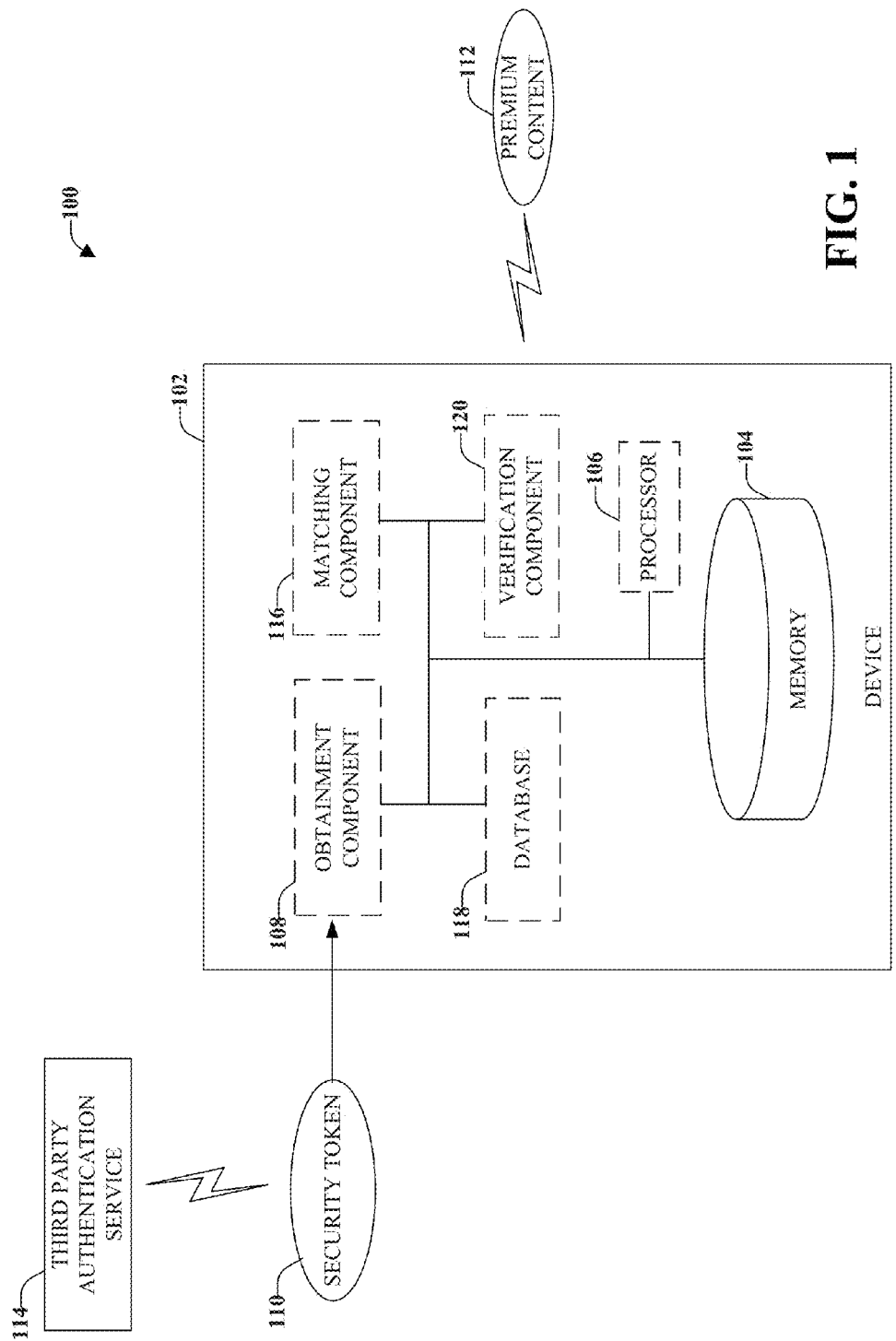
FIG. 1 illustrates an example non-limiting system that provides detection of security token reuse, according to an embodiment.

Various embodiments or features of the subject disclosure are described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosed subject matter can be practiced without these specific details, or with other methods, components, materials, and so forth. In other instances, well-known structures and components are shown in block diagram form in order to facilitate describing the subject disclosure.

By way of introduction, the subject matter disclosed herein relates to detecting reuse of a security token. In an aspect, the security token is one that is authenticated by a third party. For example, the security token can be used in a third party mediated video authentication system. The reuse of the security token can be detected by recording a first use of the security token and blocking a subsequent use of the same security token. According to an implementation, an in-memory storage (or cache) can be used to check for security token reuse. In another implementation, a centralized data store can be used to track security token use. According to another implementation, a small set of unsynchronized (or synchronized) data stores can be utilized to track use of security tokens.

One non-limiting implementation relates to system that can include a memory and a processor. The memory can store computer executable components. The processor can execute the computer executable components stored in the memory. The computer executable components can include an obtainment component that can receive a security token for access to premium content. The security token can be generated based on an access control determined by a third party authentication service. The computer executable components can also include a matching component that can compare the security token to a database of previously received security tokens and a verification component that can selectively grant access to the premium content as a result of the comparison by the matching component.

In an implementation, the verification component can grant the access to the premium content when the comparison by the matching component indicates the security token does not match at least one of the previously received security tokens. Further to this implementation, the security token can be stored in the database of previously received security tokens.

The verification component, according to an implementation, can validate the security token based on a third party verification algorithm. According to another implementation, the verification component can deny access to the premium content when the comparison by the matching component indicates the security token matches at least one of the previously received security tokens.

In a further implementation, the obtainment component can associate a received time with the security token. The system can further include an expiration component that removes the security token from the database after a predefined period of time has elapsed. The predefined period of time can be measured from the received time.

The system, according to another implementation, can include a centralized data store that includes the database of previously received security tokens. In another implementation, the system can include a first data store that retains a first version of the database and at least a second data store that retains a second version of the database. Further to this implementation, the first version of the database and the second version of the database can be unsynchronized versions of the database of previously received security tokens.

The system, according to another implementation, can include a parse component that can divide the security token into a first subset and at least a second subset. The system can also include a first authentication module that can evaluate the first subset and a second authentication module that can evaluate the second subset. The verification component can selectively grant access to the premium content based on the result of the evaluation by the first authentication module and the second authentication module.

Another non-limiting implementation relates to a method that can include using a processor to execute computer executable components stored in a memory. The method can also include receiving a first security token from a first user. The first security token can be associated with premium content. Further, the method can include providing access to the premium content based on a first use of the first security token and retaining information about the first use of the first security token. The method can also include receiving a second security token from a second user. The second security token can be associated with the premium content. The method can further include comparing the second security token with the first security token and selectively denying the second user access to the premium content as a function of the comparison.

In an implementation, retaining information about the first use can include recording the first security token in the memory. In another implementation, the first security token can be generated based on credentials issued by a third party authentication service.

The method, according to another implementation can include denying access to the premium content if the comparison indicates the second security token is the same as the first security token. In another implementation, the method can include granting access to the premium content if the comparison indicates the second security token is different from the first security token.

In accordance with another implementation, the method can include associating a received time with the first security token and tracking an amount of time that has elapsed since receiving the first security token. Further, the method can include removing the first security token from a database if the amount of time that has elapsed is longer than a threshold amount of time.

In another implementation, the method can include splitting the first security token into a first portion and a second portion. The method can also include using a first subsystem to verify the first portion and a second subsystem to verify the second portion.

According to another implementation, retaining information about the first use of the first security token can include storing the retained information in a first storage medium and a second storage medium. The first storage medium and the second storage medium can maintain separate unsynchronized versions of the retained information.

A further non-limiting implementation relates to a device that can include a memory that stores computer executable components and a processor that executes computer executable components stored in the memory. The device can include an obtainment component that can receive a security token generated based on access control determined by a third party authentication service. The security token can be used to grant access to premium content. The device can also include a matching component that can compare the security token to a plurality of received security tokens and a verification component that can selectively grant access to the premium content based, in part, on a result of the comparison by the matching component.

In an implementation, the verification component can grant access to the premium content when the comparison by the matching component indicates the security token does not match one of the plurality of received security tokens. In another implementation, the verification component can deny access to the premium content when the comparison by the matching component indicates the security token matches one of the plurality of received security tokens.

Referring initially to FIG. 1, illustrated is an example non-limiting system 100 that provides detection of security token reuse, according to an embodiment. Generally, when a third part authentication service provides authentication so that a user can view premium content, a security token is issued to the authorized user. The security token can be valid for a limited time period (e.g., 3 minutes, 5 minutes, and so forth) and can be used any number of times during the validity time period. However, rogue users might gain access to the security token and use the token during the validity time period to gain unauthorized access to the premium content. System 100 can mitigate the unauthorized access by these rogue users and, thereby close a security vulnerability.

Various embodiments of the systems, apparatuses, and/or processes explained in this disclosure can constitute machine-executable components embodied within one or more machines, such as, for example, embodied in one or more computer readable mediums (or media) associated with one or more machines. Such component(s), when executed by the one or more machines (e.g., computer(s), computing device(s), virtual machine(s), and so on) can cause the machine(s) to perform the operations described.

System 100 can be included, at least partially, on a device 102. The device 102 can be for example, a mobile phone, a desktop computer, a tablet computer, a laptop computer, a gaming device, and other types of communication devices. The device 102 can include a memory 104 that stores computer executable components and instructions. The device 102 can also include a processor 106 that executes the computer executable components stored in the memory 104. It should be noted that although one or more computer executable components may be described herein and illustrated as components separate from memory 104, in accordance with various embodiments, the one or more computer executable components could be stored in the memory 104.

In an embodiment, device 102 includes an obtainment component 108 that receives a security token 110 for access to premium content 112. The premium content 112 can be a video and associated audio content that has restricted access, wherein only a select subset of users are authorized to access the content. In an example, the premium content can be a video of Olympic Games that are released at substantially the same time as the event is occurring or at a different time. In another example, the premium content can be a movie or other copyrighted work that is restricted from viewing by the general public, but which can be viewed by those that have purchased viewing rights or have otherwise received viewing rights. In another example, the premium content can be videos that can be viewed with limited, if any, commercials or advertising content. In another example, the premium content can be accessible to various users that are identified by an owner of the content. The security token can be generated based on an access control determined by a third party authentication service 114.

The device 102 can also include a matching component 116 that can compare the security token 110 to a database 118 of previously received security tokens. For example, as security tokens are received, and during a pendency of their validity period, the security tokens can be retained in a retrievable format to allow mapping of a currently received security token to a previously received security token.

A verification component 120 can selectively grant access to the premium content 112 as a result of the comparison by the matching component 116. For example, the verification component 120 can grant the access to the premium content 112 when the comparison by the matching component 116 indicates the security token 110 does not match at least one of the previously received security tokens retained in the database 118 and based on a third party verification algorithm. For example, if the comparison indicates that the token has not been seen before, the token is processed through a third party verification algorithm (e.g., the third party authentication service 114) to determine if the token has the appropriate credentials to access the premium content 112. In some cases, the token might not pass the third party verification process and, even though the token has not previously been received, access to the premium content is denied due to the lack of appropriate credentials.

If the comparison by the matching component 116 indicates the security token 110 matches at least one of the previously received security tokens in the database (e.g., the token is being reused), the verification component 120 denies access to the premium content 112. In this case, the verification component 120 ignores the token and does not proceed to have the token processed through the third party verification process.

The security token 110 can be stored in the database 118 of previously used security tokens. Thus, the first use of the security token 110 is retained for comparison against a subsequently received security token. If a subsequent security token is received that matches the stored security token, use of the subsequent security token to gain access to premium content is denied. The denial can be performed without the need to process the token through third party verification of the proper credentials.

In an example, a first hosting site can be associated with a television broadcasting company and a second hosting site can be associated with a video-sharing website. If a user is authorized to view content published by the television broadcasting company, the user is also authorized to view the content (e.g., similar content) from the video-sharing website. In order to determine if the user is authorized to view the content from the broadcasting company, a third party site is provided the user credentials, which are independently authorized by the third party site. The third party site can provide the infrastructure and mediate the interaction between the user and the television broadcasting company. Once the third party site authenticates the user, authorization tokens for particular videos can be passed on to the video-sharing website. However, if the video-sharing website has seen the authentication token previously, the user can be denied access to content provided by the video-sharing website, as discussed herein in accordance with the disclosed aspects.

Figure 2:
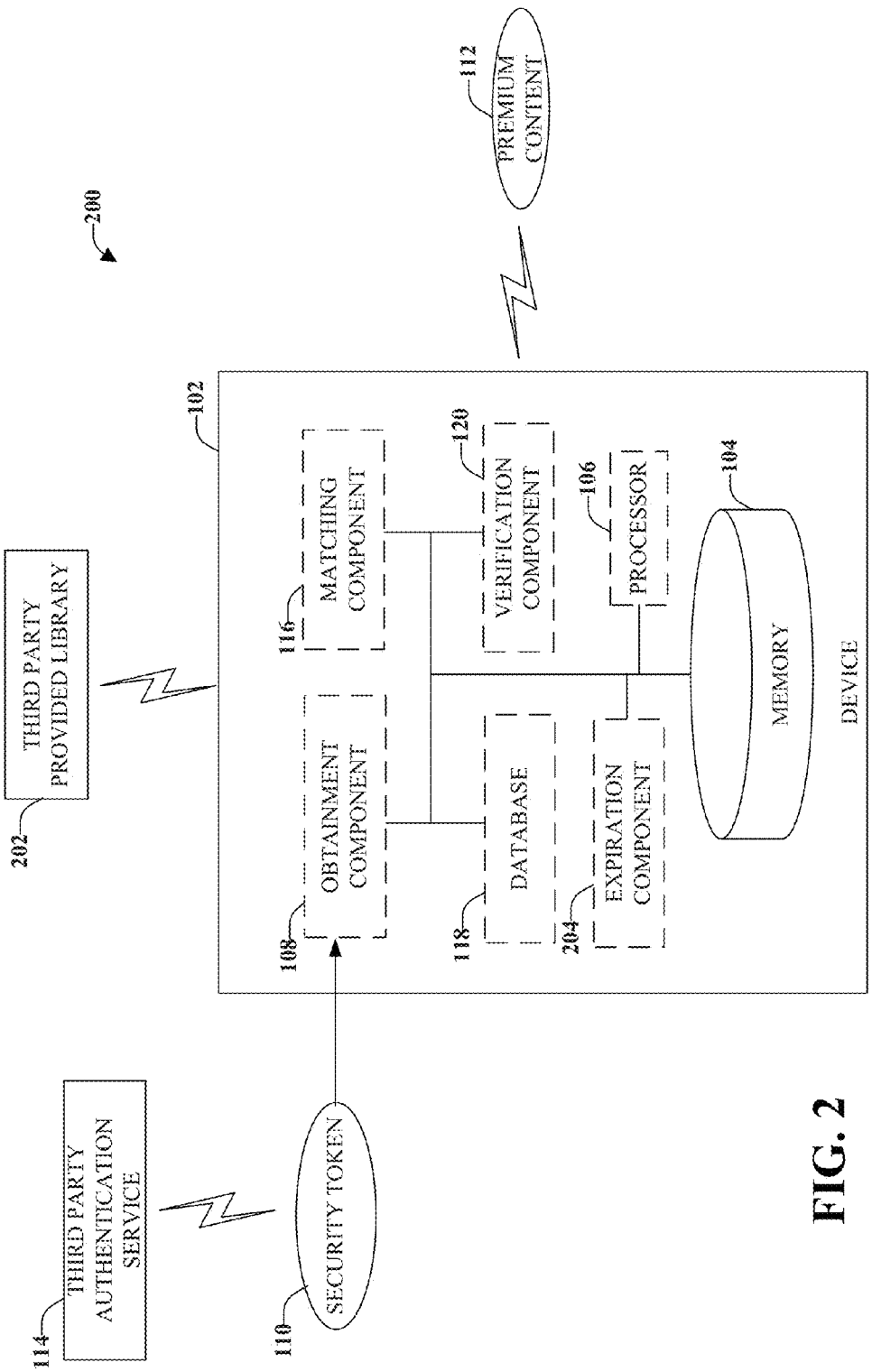
FIG. 2 illustrates another example non-limiting system that detects whether a security token has been used and denies a subsequent use of the security token, according to an embodiment.

FIG. 2 illustrates another example non-limiting system 200 that detects whether a security token has been used and denies a subsequent use of the security token, according to an embodiment. System 200 utilizes a token validation process that records a first use of a security token and blocks secondary (e.g., abusive) use of the security token. Therefore, the system 200 can close a security vulnerability associated with token validation processes. For example, an intermediate layer can reside between receiving a security token by obtainment component 108 and using a third party authentication service library 202 to verify whether the security token is valid.

For example, an in-memory storage (e.g., cache) can be used to check for token reuse, illustrated as the database 118. Whenever a token needs to be verified, the system 200 first checks to determine if the token is in the cache. If it is in the cache, the authorization is refused (since this indicates an attempt to reuse a token). If the token is not in the cache, authorization is allowed to proceed and the token can be stored in the cache.

To proceed with the authorization, the security token 110 can be processed by the third party authentication service library 202 to evaluate whether the token possesses the proper credentials to access the premium content 112. If the token does not have the proper credentials to access the premium content, the token might not be stored in cache (or might be removed from cache).

In an implementation, tokens can expire after a fixed period of time, at which point the token is expired and will not pass the library authentication. Further to this implementation, system 200 includes an expiration component 204 that removes the security token 110 from the database 118 after a predefined period of time has elapsed. For example, the obtainment component 108 can associate the received time with the security token 110. The predefined period of time can be measured from the received time. In an aspect, the predefined period of time is identified by the token and can be, for example, established by the third party that issued the token.

Additionally or alternatively, a centralized data store can be utilized to keep track of the security tokens received by the system 200. In this aspect, the centralized data store can include the database of previously received security tokens (e.g., database 118). Although this can introduce some scaling and latency overhead, particularly when there are a number of machines that are serving the videos, the centralized data store can be utilized by multiple systems, which can provide additional security features.

In addition or alternatively, a small set of synchronized or unsynchronized data stores can be used to keep track of received tokens. Although use of unsynchronized data stores might not prevent reuse of a security token entirely, usage of unsynchronized data stores can reduce the success rate of such reuse. For example, a first data store can retain a first version of the database 118 and at least a second data store can retain a second version of the database 118. The first version and the second version are unsynchronized version of the database of previously received security token. Thus, the first version of the database might be updated with a newly received security token but, since the versions are unsynchronized, the second version of the database is not updated with the newly received security token. According to some aspects, the data stores can be synchronized periodically, at defined intervals, or based on some other criteria (e.g., based upon the number of changes recorded by one of the data stores, when new premium content is available, and so forth). In another aspect, the data stores as distributed wherein the data stores are located in different geographic areas, on different sub-servers, and so forth.

Figure 3:
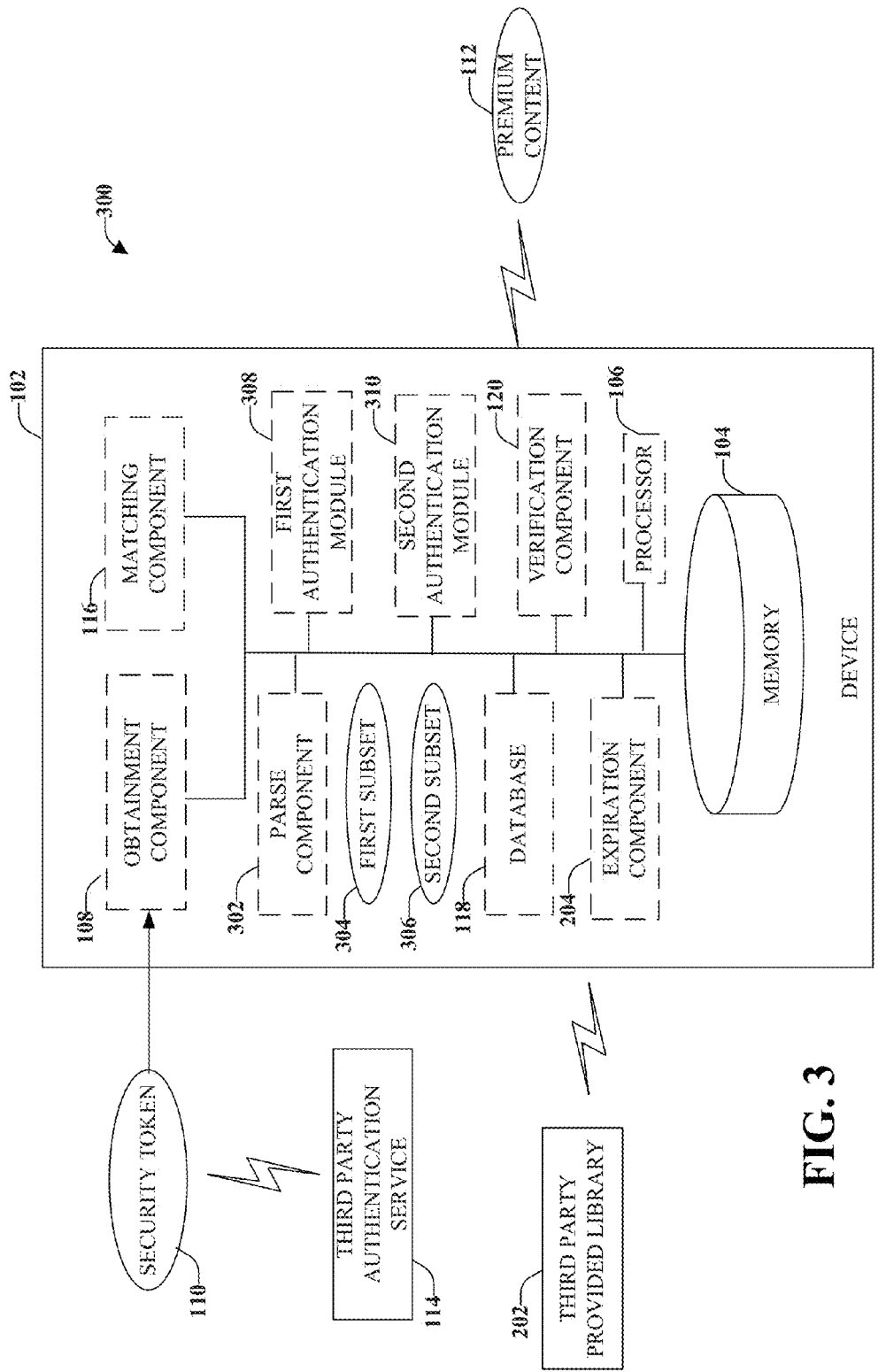
FIG. 3 illustrates another example non-limiting system that detects and mitigates token reuse, according to an embodiment.

FIG. 3 illustrates another example non-limiting system 300 that detects and mitigates token reuse, according to an embodiment. System 300 includes a parse component 302 that divides the security token 110 into a first subset 304 and at least a second subset 306. For example, the parse component 302 can utilize a sharding algorithm, which can be predefined, to divide the security token 110 into the first subset 304 and the second subset 306. Although discussed with respect to two subsets, according to an implementation, the security token 110 can be divided into any number of subsets or portions.

A first authentication module 308 can evaluate the first subset 304 and a second authentication module 310 can evaluate the second subset 306. The evaluation by the first authentication module 308 and the second authentication module 310 can be performed independently. According to some aspects, the evaluation is performed by each of the authentication modules based, in part, on information obtained from the other authentication module. Based on the result of the evaluation by the first authentication module 308 and the second authentication module 310, the verification component 120 can selectively grant access to the premium content 112. For example, the verification component 120 can further process the token (or portions thereof) through a third party provided library 202 that can independently verify if the token has the proper credentials to access the premium content. In another example, the third party provided library 202 can ascertain whether (or not) the token is within its validity period and independently deny access to those tokens that have expired.

Figure 4:
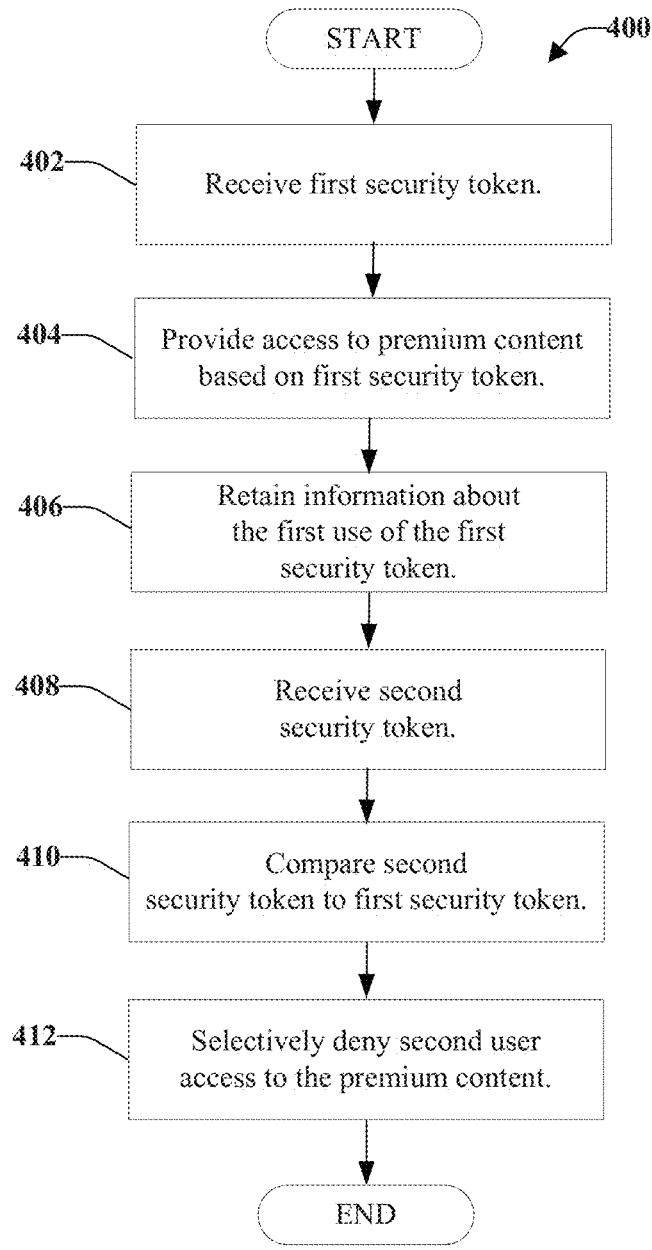
FIG. 4 illustrates an example non-limiting method for detecting and mitigating reuse of a security token for access to premium content, according to an embodiment.

FIG. 4 illustrates an example non-limiting method 400 for detecting and mitigating reuse of a security token for access to premium content, according to an aspect. While, for purposes of simplicity of explanation, the methods are shown and described as a series of acts, the disclosed subject matter is not limited by the order of acts, as some acts may occur in different orders and/or concurrently with other acts from that shown and described herein. For example, those skilled in the art will understand and appreciate that a method can alternatively be represented as a series of interrelated states or events, such as in a state diagram. Moreover, not all illustrated acts may be required to implement a method in accordance with the disclosed subject matter. Additionally, it is to be appreciated that the methods disclosed in this detailed description are capable of being stored on an article of manufacture to facilitate transporting and transferring such methodologies to computers or other computing devices. The various methods disclosed herein can use a processor to execute computer executable components stored in a memory.

Method 400 starts, at 402, when a first security token is received from a first user (e.g., using an obtainment component). The first security token can be associated with premium content. In accordance with some aspects, the first security token can be generated based on credentials issued by a third party authentication service.

At 404, access to the premium content is provided based, in part, on the first use of the first security token (e.g., using a verification component). The access to the premium content can also be based on verification by a third party, which can include whether the token has the authentication to view the premium content and/or whether the token is still valid (or has expired).

Information about the first use of the first security token is retained, at 406 (e.g., using a database). For example, information related to the first token can be retained in the memory.

In accordance with some aspects, the retained information can be stored in two or more storage mediums that can be synchronized storage mediums or unsynchronized storage mediums. In an aspect, unsynchronized storage mediums can be synchronized periodically, occasionally, constantly, or based on the occurrence of an event (e.g., broadcast of the Olympic Games).

A second security token is received from a second user at 408 (e.g., using the obtainment component). The second security token can be associated with the premium content. At 410, the second security token is compared to the first security token (e.g., using a matching component). At 412, access to the premium content is selectively denied to the second user (e.g., using the verification component) as a function of the comparing (e.g., using the matching component). For example, if the second token matches the first token (or another token), access is denied. If the second token does not match the first token (or another token), access to the premium content can be granted (e.g., based on verification provided by a third party or based on criteria provided by the third party). In such a manner, if it is determined that the token is being reused (e.g., this is at least the second time the token has been seen), access is denied without the need to undergo a third party verification process.

Figure 5:
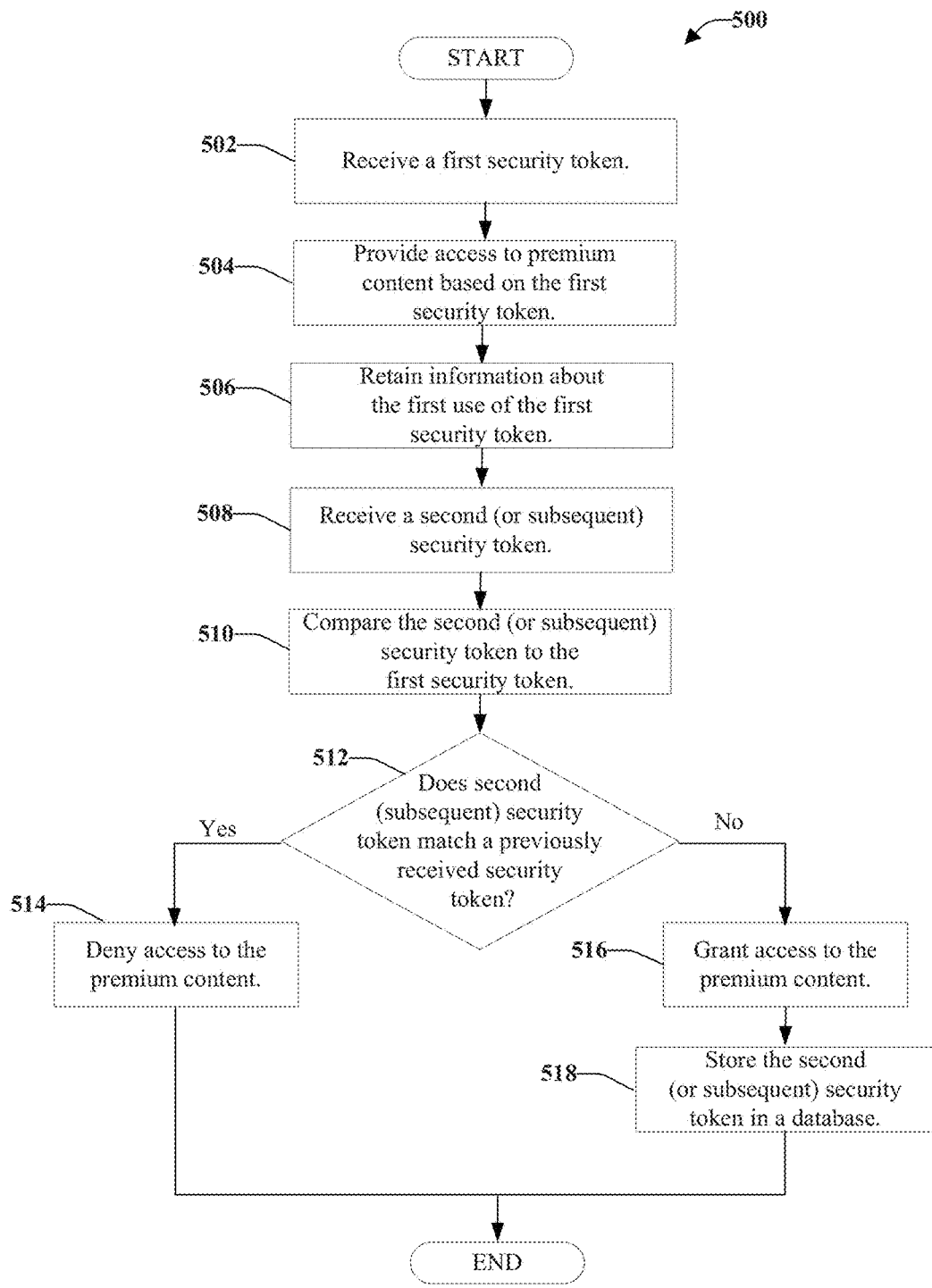
FIG. 5 illustrates another example non-limiting method for selectively granting or denying access to premium content, according to an embodiment.

FIG. 5 illustrates another example non-limiting method 500 for selectively granting or denying access to premium content, according to an embodiment. At 502, a first security token is received from a first user (e.g., using an obtainment component) and, at 504, access to premium content is provided to the first user (e.g., using a verification component). The access can be provided if the token is not being reused and has been validated through a third party verification process. Information related to the first security token is retained, at 506, such as in an in-memory storage or cache (e.g., using a database). According to an aspect, the information related to the first security token can be retained in a centralized data store. In accordance with some aspects, the information related to the first security token can be retained in a set of unsynchronized data stores, for example.

At 508, a second security token is received from a second user (e.g., using an obtainment component) and, at 510, the second security token is compared to the first security token (e.g., using a matching component). At 512, a determination is made whether the second security token matches the first security token (e.g., using the matching component). If the second security token matches the first security token "YES", the method 500 continues at 514 and access to the premium content is denied and the token is rejected (e.g., using a verification component). The denial is based on reuse of the same security token (e.g., the first security token).

If the determination at 512 is that the second authentication does not match the first security token (and any other security tokens that are retained in a storage media) "NO", method 500 continues at 516 and access to the premium content is allowed (e.g., using the verification component) after validation by a third party validation process. The second security token can be stored in a retrievable format, at 518 (e.g., using the database).

When a subsequent security token is received (e.g., using the obtainment component), method 500 can continue at 510 with a determination whether the subsequent security token matches any previously received and stored security tokens (e.g., using the matching component). If there is a match as determined at 512, access to the premium content is denied at 514 (e.g., using the verification component). If there are no matches found, access to the premium content can be granted, at 516, and the subsequent token can be retained, at 518. This act can be recursive such that any number of security tokens can be received and a determination made whether the security token is a duplicate of a previously received security token, which indicates unauthorized reuse of the token.

Figure 6:
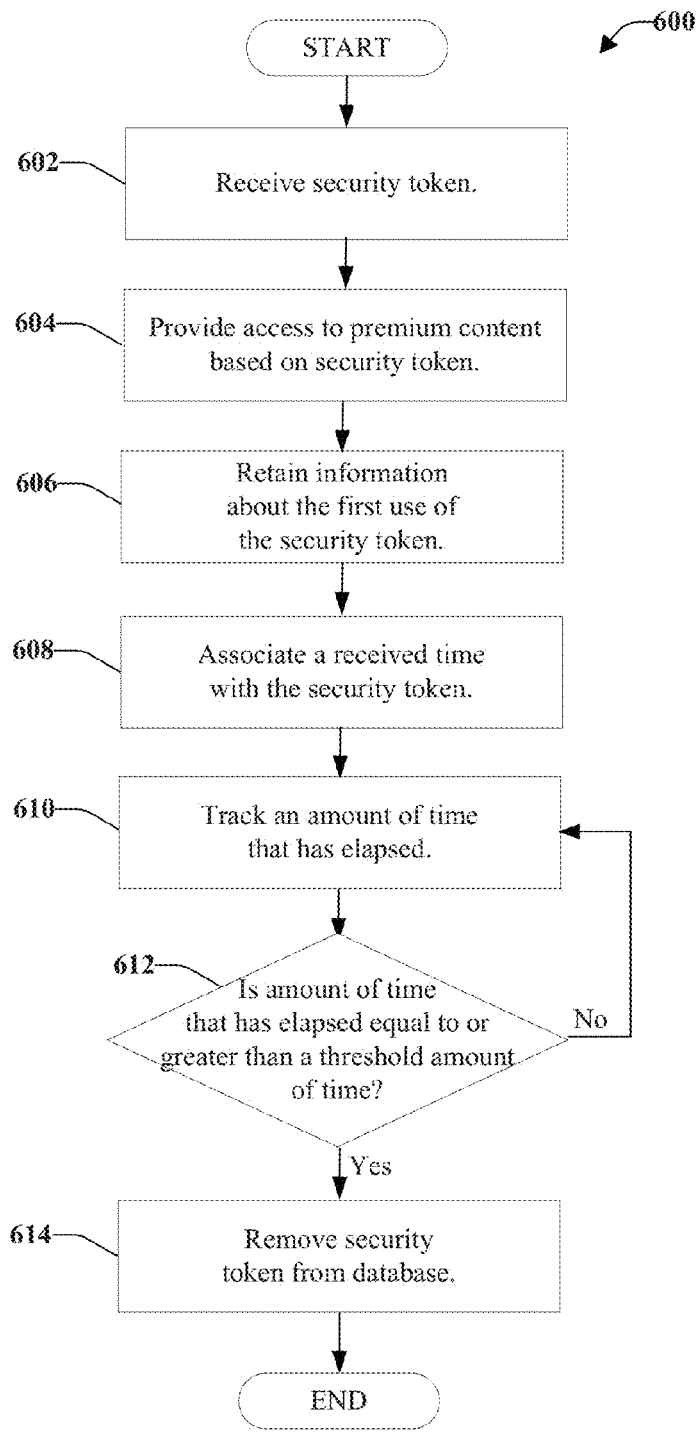
FIG. 6 illustrates an example, non-limiting method for removing expired tokens from a storage medium, according to an embodiment.

FIG. 6 illustrates an example, non-limiting method 600 for removing expired tokens from a storage medium, according to an aspect. At 602, a security token is received (e.g., using an obtainment component). The security token can be compared to previously received security tokens to determine if there is a match to at least one previously received security token (e.g., using a matching component). If there is a match, it indicates the security token is a reuse of a previously received security token. If there is no match between the security token and a previously received security token, at 604, access to premium content can be granted (e.g., using a verification component) if the security token passes a third party verification process. Information related to the security token can be retained, at 606 (e.g., using a database).

A received time can be associated with the security token, at 608 (e.g., using an obtainment component). In accordance with some aspects, the association is performed at substantially the same time as the security token is received (e.g., at 602). The amount of time that has elapsed since the security token has been received is tracked, at 610. A determination is made, at 612, whether the amount of time that has elapsed is equal to or greater than a predefined period of time. For example, security tokens might be valid for a limited amount of time (e.g., 5 minutes, 7 minutes, after a set time and day, such as 3:12 p.m. on June 3, or another short-life period). If the security token is no longer valid, it can no longer be used to unlock the premium content and access to such premium content will be refused (e.g., by a third party verification process) based on the expiration of the security token. Thus, after token expiration, there is no longer a need to track token reuse and the expired security tokens can be removed from the database or other storage medium. Therefore, if the amount of time that has elapsed is equal to or more than the predefined period of time "YES", method 600 continues at 614 and the security token is removed from the database (e.g., using an expiration component). If the predefined amount of time has not yet elapsed "NO", method 600 continues at 610 with tracking of the amount of time that has elapsed.

Figure 7:
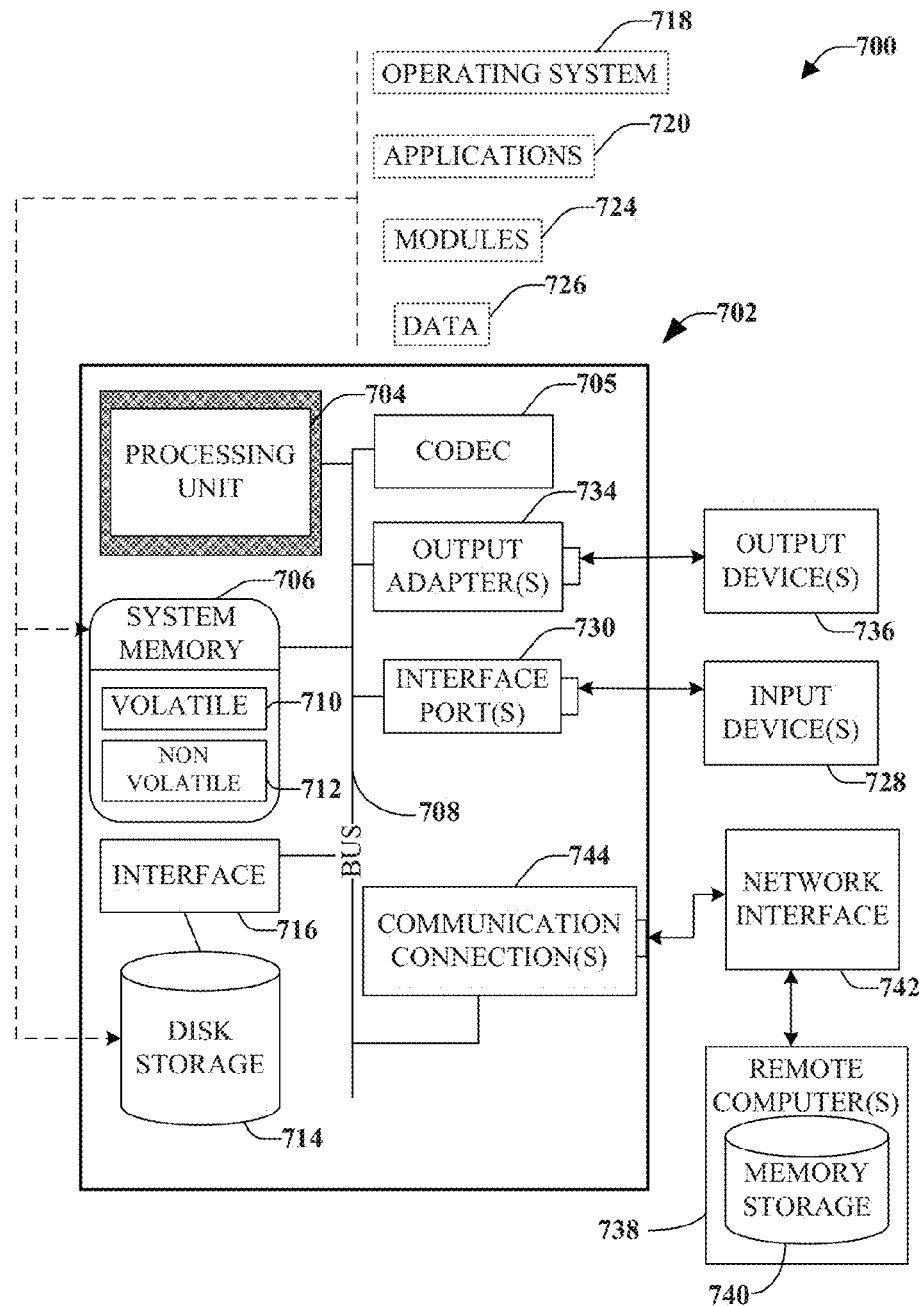
FIG. 7 illustrates a block diagram representing an exemplary non-limiting networked environment in which various embodiments can be implemented.

With reference to FIG. 7, a suitable environment 700 for implementing various embodiments of the disclosed subject matter includes a computer 702. It is to be appreciated that the computer 702 can be used in connection with implementing one or more of the systems, components, modules, or methods shown and described in connection with the above figures. The computer 702 includes a processing unit 704, a system memory 706, a codec 705, and a system bus 708. The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 706 includes volatile memory 710 and non-volatile memory 712. The basic input/output system (BIOS), containing the basic routines to transfer information between elements within the computer 702, such as during start-up, is stored in non-volatile memory 712. In addition, according to an embodiment, codec 705 may include at least one of an encoder or decoder, wherein the at least one of an encoder or decoder may consist of hardware, a combination of hardware and software, or software. Although, codec 705 is depicted as a separate component, codec 705 may be contained within non-volatile memory 712. By way of illustration, and not limitation, non-volatile memory 712 can include read only memory (ROM), programmable ROM (PROM), electrically programmable ROM (EPROM), electrically erasable programmable ROM (EEPROM), or flash memory. Volatile memory 710 includes random access memory (RAM), which acts as external cache memory. According to various embodiments, the volatile memory may store write operation retry logic (not shown in FIG. 7) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 702 may also include removable/non-removable, volatile/non-volatile computer storage medium. FIG. 7 illustrates, for example, disk storage 714. Disk storage 714 includes, but is not limited to, devices such as a magnetic disk drive, solid state disk (SSD) floppy disk drive, tape drive, Jaz drive, Zip drive, LS-70 drive, flash memory card, or memory stick. In addition, disk storage 714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 714 to the system bus 708, a removable or non-removable interface can be used, such as interface 716.

It is to be appreciated that FIG. 7 describes software that acts as an intermediary between users and the basic computer resources described in the suitable operating environment 700. Such software includes an operating system 718. Operating system 718, which can be stored on disk storage 714, acts to control and allocate resources of the computer 702. Applications 720 take advantage of the management of resources by operating system 718 through program modules 724 and program data 726, such as boot/shutdown transaction table and the like, stored either in system memory 706 or on disk storage 714. It is to be appreciated that the disclosed embodiments can be implemented with various operating systems or combinations of operating systems.

A user enters commands or information into the computer 702 through input device(s) 728 (e.g., a user interface). Input devices 728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 704 through the system bus 708 via interface port(s) 730. Interface port(s) 730 include, for example, a serial port, a parallel port, a game port, and a universal serial bus (USB). Output device(s) 736 use some of the same type of ports as input device(s) 728. Thus, for example, a USB port may be used to provide input to computer 702, and to output information from computer 702 to an output device 736. Output adapter 734 is provided to illustrate that there are some output devices 736 such as monitors, speakers, and printers, among other output devices 736, which require special adapters. The output adapters 734 include, by way of illustration and not limitation, video and sound cards that provide a means of connection between the output device 736 and the system bus 708. It should be noted that other devices and/or systems of devices provide both input and output capabilities such as remote computer(s) 738.

Computer 702 can operate in a networked environment using logical connections to one or more remote computers, such as remote computer(s) 738 (e.g., a family of devices). The remote computer(s) 738 can be a personal computer, a server, a router, a network PC, a workstation, a microprocessor based appliance, a peer device, a smart phone, a tablet, or other network node, and can includes many of the elements described relative to computer 702. For purposes of brevity, only a memory storage device 740 is illustrated with remote computer(s) 738. Remote computer(s) 738 is logically connected to computer 702 through a network interface 742 and then connected via communication connection(s) 744. Network interface 742 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks such as Integrated Services Digital Networks (ISDN) and variations thereon, packet switching networks, and Digital Subscriber Lines (DSL).

Communication connection(s) 744 refers to the hardware/software employed to connect the network interface 742 to the system bus 708. While communication connection 744 is shown for illustrative clarity inside computer 702, it can also be external to computer 702. The hardware/software necessary for connection to the network interface 742 includes, for exemplary purposes only, internal and external technologies such as, modems including regular telephone grade modems, cable modems and DSL modems, ISDN adapters, and wired and wireless Ethernet cards, hubs, and routers.

Figure 8:
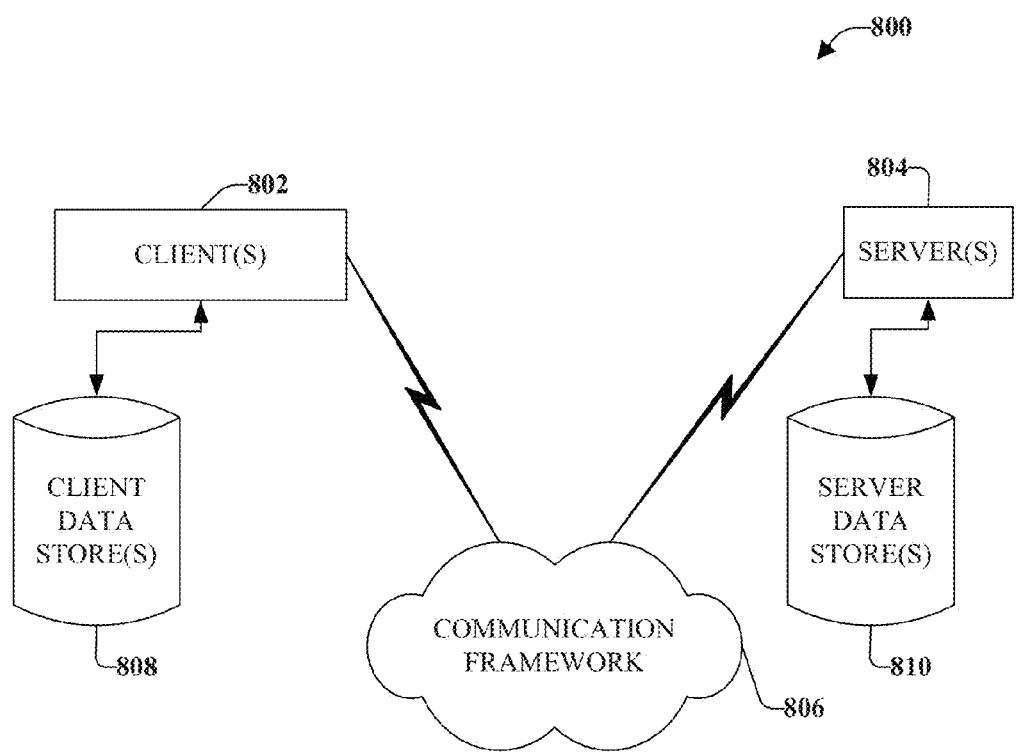
FIG. 8 illustrates a block diagram representing an exemplary non-limiting computing system or operating environment in which various embodiments may be implemented.

Referring now to FIG. 8, there is illustrated a schematic block diagram of a computing environment 800 in accordance with the disclosed embodiments. The computing environment 800 includes one or more client(s) 802 (e.g., laptops, smart phones, PDAs, media players, computers, portable electronic devices, tablets, and the like). The client(s) 802 can be hardware and/or software (e.g., threads, processes, computing devices). The computing environment 800 also includes one or more server(s) 804. The server(s) 804 can also be hardware or hardware in combination with software (e.g., threads, processes, computing devices). The servers 804 can house threads to perform transformations by employing aspects of this disclosure, for example. One possible communication between a client 802 and a server 804 can be in the form of a data packet transmitted between two or more computer processes wherein the data packet may include video data. The data packet can include metadata, such as associated contextual information for example. The computing environment 800 includes a communication framework 806 (e.g., a global communication network such as the Internet, or mobile network(s)) that can be employed to facilitate communications between the client(s) 802 and the server(s) 804.

Communications can be facilitated via a wired (including optical fiber) and/or wireless technology. The client(s) 802 include or are operatively connected to one or more client data store(s) 808 that can be employed to store information local to the client(s) 802 (e.g., associated contextual information). Similarly, the server(s) 804 operatively include or are operatively connected to one or more server data store(s) 810 that can be employed to store information local to the servers 804.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject disclosure. Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of various embodiments. It is, of course, not possible to describe every conceivable combination of components or methodologies for purposes of describing the one or more aspects, but it is to be appreciated that many further combinations and permutations of the various aspects are possible. Accordingly, the subject disclosure is intended to embrace all such alterations, modifications, and variations. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosed illustrated exemplary aspects of the disclosed subject matter. In this regard, it will also be recognized that the aspects include a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art. Although the components described herein are primarily described in connection with performing respective acts or functionalities, it is to be understood that in a non-active state these components can be configured to perform such acts or functionalities.

In addition, while a particular feature may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component", "module", "system", or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific functions; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, for example, via access requests, queries, or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, for example, a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In addition, while a particular feature of the disclosed aspects may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
a memory that stores computer executable components; and
a processor that executes the following computer executable components stored in the memory:
an obtainment component that receives a security token for access to premium content, the security token is generated based on an access control determined by a third party authentication service;
a first data store that retains a first version of a database of security tokens;
a second data store that retains a second version of the database of security tokens, wherein the first version and the second version are unsynchronized versions of the database of security tokens;
a matching component that compares the security token to the first version or the second version of the database of security tokens previously received for access to the premium content; and
a verification component that selectively grants access to the premium content as a result of the comparison by the matching component.

2. The system of claim 1, the verification component grants access to the premium content when the comparison by the matching component indicates the security token does not match at least one security token of the database of security tokens.

3. The system of claim 1, the verification component validates the security token based on a third party verification algorithm.

4. The system of claim 1, the security token is stored in the database of security tokens.

5. The system of claim 1, the verification component denies access to the premium content when the comparison by the matching component indicates the security token matches at least one security token of the first version or the second version of the database of security tokens.

6. The system of claim 1, the obtainment component associates a received time with the security token, the system further comprising an expiration component that removes the security token from the first version and the second version of the database of security tokens after a predefined period of time has elapsed, the predefined period of time is measured from the received time.

7. The system of claim 1, further comprising a centralized data store that comprises the database of security tokens.

8. The system of claim 1, further comprising:
a parse component that divides the security token into a first subset and at least a second subset;
a first authentication module that evaluates the first subset; and
a second authentication module that evaluates the at least the second subset, the verification component selectively grants access to the premium content based on the result of the evaluation by the first authentication module and the second authentication module.

9. A method, comprising:
using a processor to execute the following computer executable components stored in a memory:
receiving a first security token from a first device, the first security token is associated with premium content;
splitting the first security token into a first portion and a second portion;
using a first subsystem to verify a first use of the first portion and a second subsystem to verify the first use of the second portion;
providing access to the premium content based on the first use of the first security token;
retaining information about the first use of the first security token;
receiving a second security token from a second device, the second security token is associated with the premium content;
comparing the second security token with the first security token; and
selectively denying the second device access to the premium content as a function of the comparing.

10. The method of claim 9, wherein the retaining comprises recording the first security token in the memory.

11. The method of claim 9, the first security token is generated based on credentials issued by a third party authentication service.

12. The method of claim 9, further comprising denying access to the premium content if the comparing indicates the second security token is the same as the first security token.

13. The method of claim 9, further comprising granting access to the premium content if the comparing indicates the second security token is different from the first security token.

14. The method of claim 9, further comprising:
associating a received time with the first security token;
tracking an amount of time that has elapsed since receiving the first security token; and
removing the first security token from a database if the amount of time that has elapsed is longer than a threshold amount of time.

15. The method of claim 9, wherein the retaining information about the first use of the first security token comprising:
storing the retained information in a first storage medium and a second storage medium, the first storage medium and the second storage medium maintain separate unsynchronized versions of the retained information.

16. The method of claim 9, further comprising validating the second security token based on a third party verification algorithm.

17. A device, comprising:
a memory that stores computer executable components; and
a processor that executes the following computer executable components stored in the memory:
an obtainment component that receives a security token generated based on access control determined by a third party authentication service, the security token is used to grant access to premium content;
a parse component that divides the security token into a first subset and at least a second subset;
a matching component that compares the security token to a plurality of security tokens previously received for access to the premium content comprising,
a first authentication module that evaluates the first subset; and
a second authentication module that evaluates the at least the second subset; and
a verification component that selectively grants access to the premium content based, in part, on a result of the comparison by the matching component.

18. The device of claim 17, the verification component grants access to the premium content when the comparison by the matching component indicates the security token does not match one of the plurality of security tokens previously received and denies access to the premium content when the comparison by the matching component indicates the security token matches one of the plurality of security tokens previously received.

19. The device of claim 17, wherein the obtainment component associates a received time with the security token, the device further comprises an expiration component that removes the security token from a database of security tokens after a predefined period of time has elapsed, the predefined period of time is measured from the received time.

20. The device of claim 17, further comprising a centralized data store that comprises a database of security tokens.

* * * * *